(12) United States Patent
Bu et al.

(10) Patent No.: US 7,932,139 B2
(45) Date of Patent: Apr. 26, 2011

(54) METHODOLOGY OF IMPROVING THE MANUFACTURABILITY OF LASER ANNEAL

(75) Inventors: Haowen Bu, Plano, TX (US); Amitabh Jain, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 955 days.

(21) Appl. No.: 11/743,440

(22) Filed: May 2, 2007

(65) Prior Publication Data
US 2008/0272097 A1 Nov. 6, 2008

(51) Int. Cl.
*H01L 21/268* (2006.01)
*B23K 26/00* (2006.01)

(52) U.S. Cl. .................................. 438/166; 219/121.66
(58) Field of Classification Search ............... 438/166, 438/487; 219/121.66
See application file for complete search history.

(56) References Cited

U.S. PATENT DOCUMENTS

| | | | |
|---|---|---|---|
| 4,151,014 A | 4/1979 | Charschan et al. | |
| 6,274,414 B1 | 8/2001 | Ogata et al. | |
| 6,387,779 B1 | 5/2002 | Yi et al. | |
| 6,440,824 B1 | 8/2002 | Hayashi et al. | |
| 6,536,237 B1 | 3/2003 | Jung | |
| 6,537,863 B1 | 3/2003 | Jung | |
| 6,563,077 B2* | 5/2003 | Im | 219/121.65 |
| 7,061,017 B2 | 6/2006 | Ogata et al. | |
| 7,132,204 B2 | 11/2006 | Jung | |
| 2004/0065643 A1* | 4/2004 | Tanaka | 219/121.8 |
| 2005/0059222 A1* | 3/2005 | You | 438/486 |
| 2005/0103998 A1* | 5/2005 | Talwar et al. | 438/795 |
| 2005/0189542 A1* | 9/2005 | Kudo et al. | 438/487 |
| 2007/0072400 A1* | 3/2007 | Bakeman | 438/487 |
| 2007/0212858 A1* | 9/2007 | Fujino et al. | 438/486 |
| 2008/0108209 A1* | 5/2008 | Kraus et al. | 438/517 |
| 2008/0191121 A1* | 8/2008 | Yoo et al. | 438/795 |
| 2008/0210671 A1* | 9/2008 | Jennings et al. | 219/121.61 |

FOREIGN PATENT DOCUMENTS

| | | | |
|---|---|---|---|
| JP | 1-276622 A | * | 11/1989 |
| JP | 11-345783 A | * | 12/1999 |

* cited by examiner

*Primary Examiner* — Geoffrey S Evans
(74) *Attorney, Agent, or Firm* — Warren L. Franz; Wade J. Brady, III; Frederick J. Telecky, Jr

(57) ABSTRACT

A method of laser annealing a workpiece for reduction of warpage, slip defects and breakage, the method comprising (a) moving a workpiece through a laser beam in a x-axis first direction, (b) moving the workpiece in a y-axis second direction, (c) moving the workpiece through a laser beam in a minus x-axis first direction and repeating (a)-(c) until the workpiece is fully annealed in two successive laser annealing iterations.

22 Claims, 6 Drawing Sheets

METHODOLOGY OF IMPROVING THE MANUFACTURABILITY OF LASER ANNEAL

FIELD OF INVENTION

The present invention relates generally to semiconductor processing methods, and more specifically to a method for improving the efficiency of a laser annealing process associated with a semiconductor substrate.

BACKGROUND OF THE INVENTION

The downsizing of semiconductor devices continues with precise doping and ultra-shallow junctions required for the containment of short-channel effects, improvement of parasitic resistance, and the like. Various advanced methods to obtain shallow junctions having low resistance have been developed. Recently, laser annealing (LA) methods have received considerable interest as one of the alternatives for the formation of the ultra-shallow junctions. The laser annealing process has several advantages over other conventional annealing methods: (1) An extremely low thermal budget introduced within a short time period for minimizing dopant diffusion, typically less than a millisecond; (2) selective annealing and re-crystallizing of specific regions of the device and to specific depths within the device; (3) high dopant activating results since higher annealing temperature can be achieved. High dopant activation is a result of the increased dopant solid solubility in silicon. However, current laser annealing processing poses some problems in semiconductor device manufacturing. One problem encountered in the fabrication of a silicon workpiece is warping of the substrate surface and generation of slips of silicon crystal lattice during the laser annealing process. This warping often shows up as alignment problems at subsequent patterning steps and therefore reduces process yield. It is common for a wafer to become warped and slip defects are generated during ultra-high temperature (e.g., greater than 1200 degrees Celsius), laser anneal processes, especially when the annealing temperature is close to the melting point of the wafer (e.g. 1410 degrees Celsius for silicon wafers). During the anneal, the residual stress and visoplastic strain could be induced due to the low yield strength and the high thermal stress induced by nonuniform temperature distribution and thermal expansion mismatch among dissimilar materials. This is likely the cause of the bending (warpage) and plastic deformation (slip) in the integrated structures. Another difficulty encountered in a laser annealing process is breaking of the workpiece. This is frequently and most noticeably encountered at the edge of the workpiece if a laser beam of full process power hits at the workpiece edge, wherein a portion of the edge can break off.

Accordingly, there is a need for improved laser annealing processing by which the benefits of laser annealing can be achieved while avoiding or mitigating the problems encountered in the conventional laser annealing techniques.

SUMMARY OF THE INVENTION

The following presents a simplified summary in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to laser annealing methods therefor, by which the above mentioned and other shortcomings of current laser annealing methods and techniques can be mitigated or overcome.

In one embodiment, the invention is directed to a method of laser annealing a workpiece, the method comprising, (a) moving a workpiece through a laser beam in a x-axis first direction, (b) moving the workpiece in a y-axis second direction, (c) moving the workpiece through a laser beam in a minus x-axis first direction, repeating (a)-(c) until the workpiece is fully annealed in two successive laser annealing iterations.

In another embodiment, the invention is directed to a method of laser annealing that reduces semiconductor workpiece warping and edge breakage, comprising scanning a laser beam on the workpiece along an x-axis in a first direction, moving the workpiece in a y-axis second direction that is different than the first direction, performing the laser anneal at a first laser power when the laser beam is on the workpiece and greater than 2 millimeters away from the workpiece edge, and performing the laser anneal at a second lower laser power when the laser beam is 2 millimeters or less from the workpiece edge or off the workpiece.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1A:
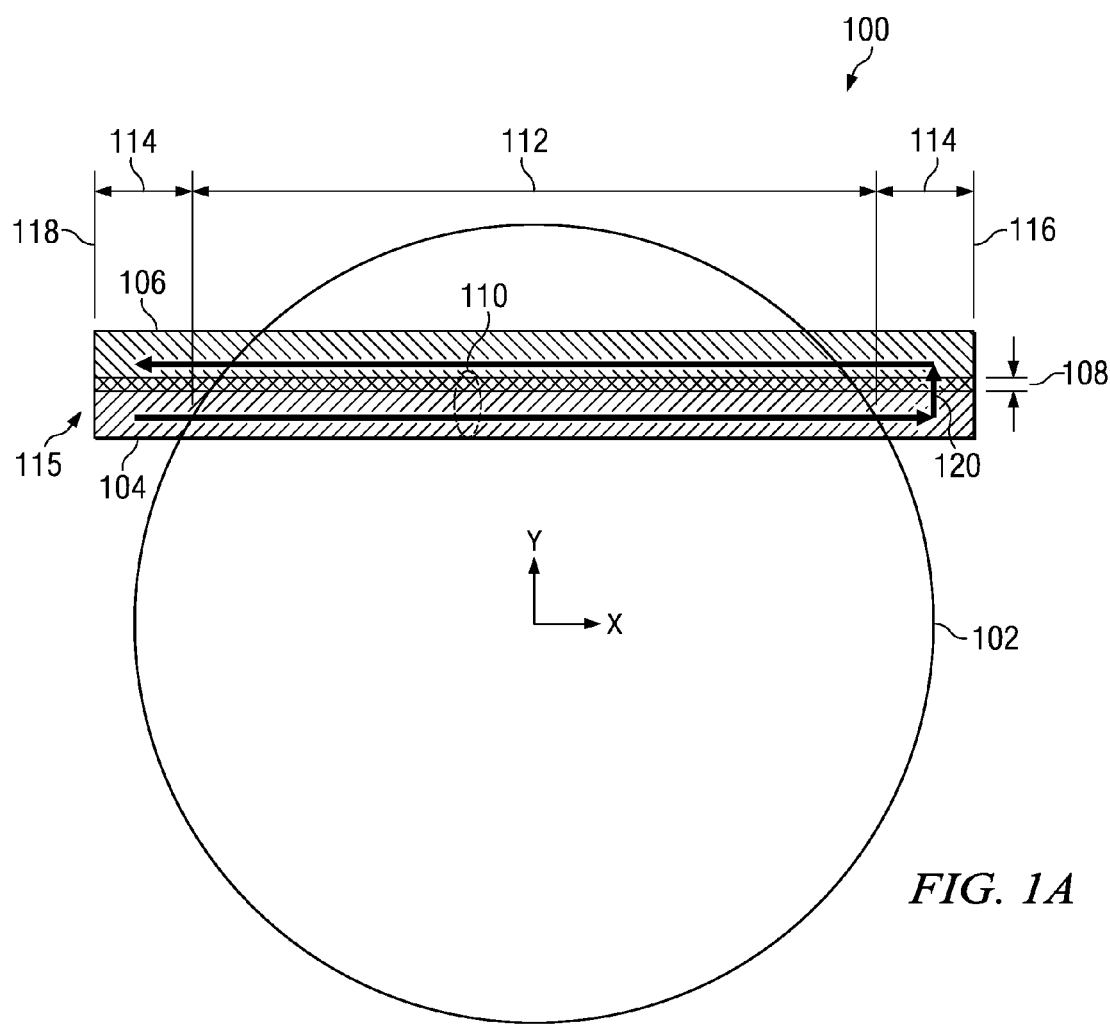
FIG. 1A is a simplified top view illustrating a laser scanning pattern on a workpiece according to one aspect of the present invention.

One or more implementations of the present invention will now be described with reference to the attached drawings, wherein like reference numerals are used to refer to like elements throughout, and wherein the illustrated structures are not necessarily drawn to scale. The invention relates to a method for improving the manufacturability of the laser annealing process in the fabrication of semiconductors. It should be understood that the description of these aspects are merely illustrative and that they should not be taken in a limiting sense. In the following description, for purposes of explanation, numerous specific details are set forth in order to provide a thorough understanding of the present invention. It will be evident to one of ordinary skill in the art, however, that the present invention may be practiced without these specific details.

Figure 1B:
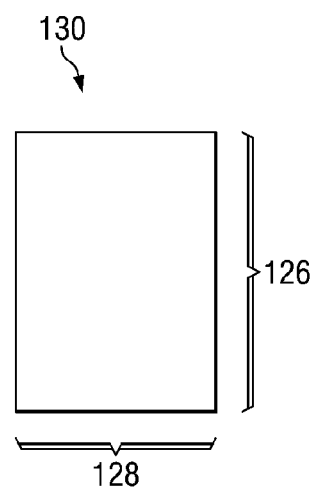
FIG. 1B is a top view illustrating an example of a laser beam cross section.

Turning now to the figures and referring initially to FIGS. 1A and 1B, an exemplary partial laser annealing pattern is illustrated utilizing a rectangular laser (FIG. 1B), for example. The laser annealing process can be performed at various times within the overall semiconductor workpiece fabrication, for example, to replace or as an addition to the conventional rapid thermal annealing (RTA) processes that are well known by those of ordinary skill in the art. The RTA typically has an anneal time of about 1-5 seconds. By comparison, less than 1 millisecond can be achieved with laser anneal. Thus, the laser anneal process can be performed to activate an implanted dopant species in the gate stack and source drain regions of CMOS transistors, without excessive diffusion, for example. The inventors recognized that by scanning the entire workpiece in two successive laser anneals at a 20 degree Celsius lower temperature (e.g., at about 1300 degree Celsius) than conventionally employed in a single laser anneal (e.g., at about 1320 degree Celsius), that this would result in approximately 25% less workpiece warpage, for example, while achieving similar dopant diffusion and activation. A first laser annealing process 100 (FIG. 1A) in one embodiment is performed at a temperature of about 1300° C. or less, for example. The laser beam 130 (FIG. 1B) with a width 128 of approximately 0.15 millimeters and a height 126 of approximately 7 millimeters can be scanned in a generally horizontal direction along the x-axis in a first direction 104 that corresponds to the wide portion 112 of the workpiece 102 plus some overshoot 114 on both ends of the workpiece 102. The laser scanning rate is approximately 150 millimeters per second or less, resulting in a laser dwell time of about 1 millisecond. The overshoot 114, corresponds to the laser beam 110 (FIG. 1A) or 130 (FIG. 1B) scanned past the workpiece 102 and therefore no longer impinging on the workpiece 102. Once the beam 130 is moved to the furthest point 116 in the x-direction, the laser beam 130 is moved along a second scan path 120 in the y-direction, for example. The laser beam 130 can then be moved in a minus x-direction 106 until it reaches the furthest point 118, for example. A typical beam overlap 108 is approximately 2-4 millimeters. It should be appreciated that the scan pattern 115 is basically independent of the size and/or shape of the workpiece 102 in that only the widest portion 112 of the workpiece 102, for scan 104 is considered so that the first horizontal scan pattern 115 is large enough to cover the widest portion 112 of the workpiece 102.

This process is continued until the entire upper surface of the workpiece 102 has been laser annealed. The laser anneal process 100 is then repeated with a second horizontal scan pattern (not shown) that is parallel to the first scan pattern 115. This process of performing two successive laser anneals of the upper surface workpiece 102 at approximately about 1300 degrees C. or lower for equivalent dopant activation results in approximately 25% less warpage than conventional laser anneal processes. The lowered warpage is a result of lowered thermal stress at a lower temperature. It should be appreciated that the annealing process can be executed by moving the laser beam over the stationary workpiece, or by moving the workpiece through a stationary laser beam, or a combination thereof.

It is observed that the warpage is asymmetrical, i.e., the warpage along x-direction where laser beam has a width of about 0.15 millimeter (128 in FIG. 1B) tends to be smaller than that along y-direction where the laser beam has a length of about 7 millimeters (126 in FIG. 1B). The asymmetry is likely caused by the larger temperature gradient along x-direction than y-direction. Better heat dissipation is expected when temperature gradient is larger, resulting in less warpage.

Taking advantage of this asymmetry in warpage, a second laser annealing process 200 (FIG. 2) in another embodiment is performed at a temperature of about 1300° C. or less, for example. The process 200 is similar to the process 100, except a second laser annealing process 222 is performed on the entire surface of the workpiece 202 and is performed approximately orthogonal to the first laser annealing process 215. In the first laser annealing process the laser beam 130 (FIG. 1B) with a width 128 of approximately 0.15 millimeters and a height 126 of approximately 7 millimeters, for example, can be scanned in a generally horizontal direction along the x-axis in a first direction 204 that corresponds to the wide portion 212 of the workpiece 202 plus some overshoot 214 on both ends of the workpiece 202. The laser scanning rate is 150 millimeters per second or less. The overshoot 214, corresponds to the laser beam 130 (FIG. 1B) scanned past the workpiece 202 and therefore no longer impinging on the workpiece 202. It can be appreciated, as discussed supra, that the scan pattern is basically independent of the size and/or shape of the workpiece 202 in that only the widest portion 212 of the workpiece 202, for scan 204 is considered so that the first horizontal scan pattern 215 is large enough to cover this widest portion 212 of the workpiece 202.

This process is continued until the entire upper surface of the workpiece 202 has been laser annealed. The laser anneal process 100 is then repeated with a second vertical scan pattern 222 that is perpendicular to the first scan pattern 215. This process of performing two successive, approximately orthogonal laser anneals of the upper surface workpiece 202 at approximately about 1300 degrees C. or lower for equivalent dopant activation results in approximately 35% less warpage than conventional laser anneal processes, as the overall warpage is lowered by averaging the asymmetrical micro warpage. It should be appreciated that the annealing process can be executed by moving the laser over the stationary workpiece, or by moving the workpiece through a stationary laser beam, or a combination thereof.

A laser annealing process 300 (FIG. 3) in yet another embodiment is performed at a temperature of about 1300° C. or less, for example. The process 300 is similar to the process 100, except a first laser anneal is performed at a faster scanning rate and a second laser annealing process is not performed, for example. The inventors recognized that if a laser annealing time was reduced by a factor of two, for example, the workpiece warpage could be reduced by approximately 50%. In the laser annealing process the laser beam 130 (FIG. 1B) with a width 128 of approximately 0.15 millimeters and a height 126 of approximately 7 millimeters (FIG. 2), for example, can be scanned in a generally horizontal direction along the x-axis in a first direction 204 that corresponds to the wide portion 212 of the workpiece 202 plus some overshoot 214 on both ends of the workpiece 202. The laser scanning rate as discussed supra, can be increased to approximately 300 millimeters per second to 500 millimeters per second. Increasing the scan rate effectively reduces the laser dwell time from about 1 millisecond to 0.3-0.5 millisecond. Typically, the laser power density needs to be raised to achieve the same temperature when the scan rate is faster. Shorter dwell time takes advantage of the plastoelasticity of silicon, resulting in less slip defects and warpage.

The process begins at 302 wherein a laser beam 130 (FIG. 1B) with a width 128 of approximately 0.15 millimeters and a height 126 of approximately 7 millimeters, for example, can be scanned in a generally horizontal direction along the x-axis in a first direction 204 (FIG. 2) that corresponds to the wide portion 212 of the workpiece 202 plus some overshoot 214 on both ends of the workpiece 202. Once the beam 130 is moved to the furthest point 216 in the x-direction, the laser beam 130 at 304 (FIG. 3) is moved along a second scan path 220 in the y-direction (FIG. 2), for example. At 306 of FIG. 3 the laser beam 130 can then be moved in a minus x-direction 206 (FIG. 2) until it reaches the furthest point 218. A typical beam overlap 208 is approximately 2-4 millimeters, for example. It can be appreciated, as discussed supra, that the scan pattern is basically independent of the size and/or shape of the workpiece 202 in that only the widest portion 212 of the workpiece 202, for scan 204 is considered so that the first horizontal scan pattern 215 is large enough to cover this widest portion 212 of the workpiece 202. This process 302, 304 and 306 is continued until the entire upper surface of the workpiece 202 (FIG. 2) has been laser annealed.

Figure 4:
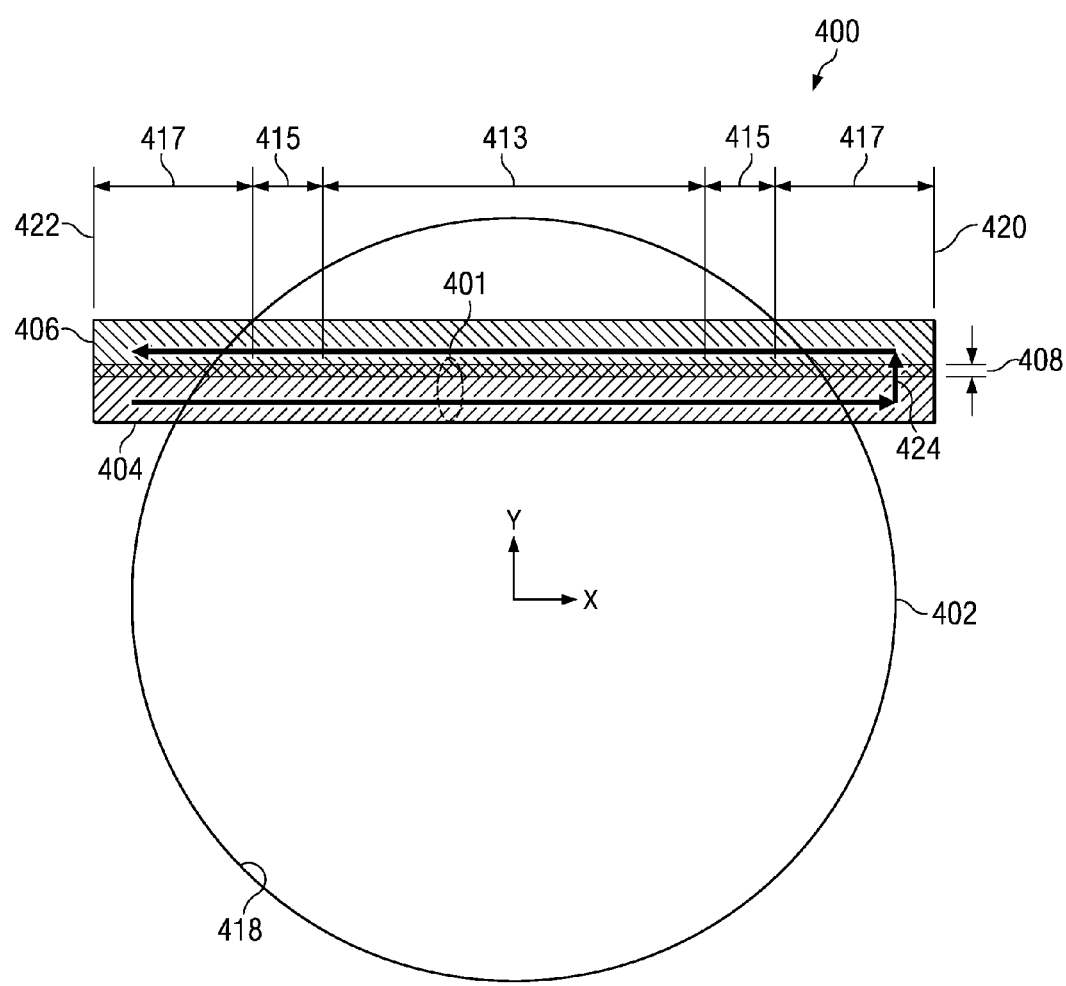
FIG. 4 is a block diagram illustrating a laser annealing process on the substrate in accordance with another exemplary aspect of the present invention.

FIG. 4 illustrates another embodiment of a laser annealing process 400 employing a pulsed CO2 laser, for example. The laser annealing process 400 can be performed at various times within the overall semiconductor workpiece fabrication, for example. The workpiece can be made of silicon, germanium, silicon germanium alloy or any other suitable materials. The laser beam 401 can be scanned across the workpiece 402 in a generally horizontal direction first scan path 404 that corresponds to high power region 413 of the workpiece 402, a low power region 415 and a workpiece overshoot 417. The overshoot 417, corresponds to instances where the laser beam 401 is scanned past the workpiece 402 and therefore no longer impinges on the workpiece 402. In this embodiment, a laser power setting of 3000 watts is utilized when the laser beam 401 is on the workpiece 402 in the high power region 413 which is on the workpiece 402 at a distance greater than 2 millimeters from workpiece edge 418. When the laser beam 401 is less than or equal to 2 millimeters from the workpiece edge 418 or off of the workpiece 402 the power setting is reduced to approximately 1500 watts, for example. The inventors recognized that by using this technique workpiece edge breakage could be reduced thereby increasing workpiece throughput and yields.

Once the beam is moved to the furthest point 420 in the x-direction, the laser beam is moved along a second scan path 424 in the y-direction, for example. The laser beam 401 can then be moved in the minus x-direction until it reaches the furthest point 422. A typical beam overlap 408 is approximately about 2-4 millimeters. The laser annealing process is continued until the entire upper surface of the workpiece 402 is laser annealed.

Figure 5:
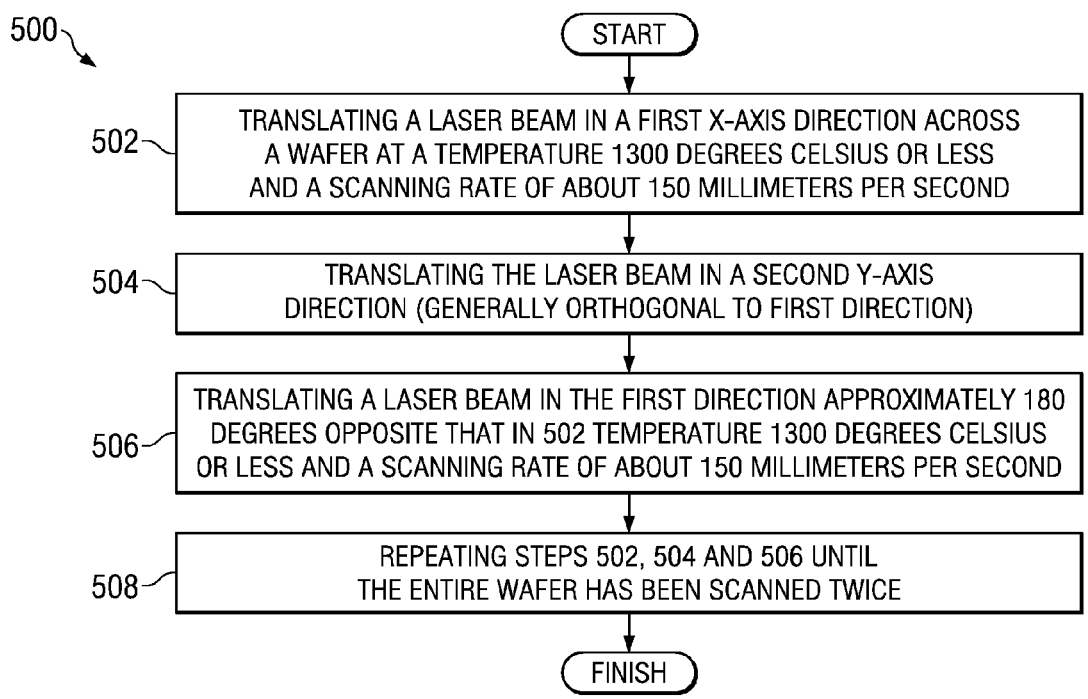
FIG. 5 is a block diagram of another exemplary laser annealing process for optimizing an annealing process according to yet another exemplary aspect of the invention.

FIG. 5 is a flow diagram illustrating a method 500 of operating a laser annealing method in accordance with an aspect of the present invention. The method 500 begins at block 502 wherein a laser is provided. The laser can be a pulsed CO2 laser or any other suitable laser that has enough power density to anneal the workpiece at the desired temperature. The laser has one or more tunable parameters that can be adjusted in order to modulate the laser annealing process. Some examples of parameters that modulate laser power include, for example, input power, laser beam size, temperature, dwell time, the temperature of the chuck where the workpiece sits on when laser annealing takes place, and the like. The laser generates a laser beam having a nominal temperature at block 502. Generally, the nominal or base temperature value is below a maximum producible temperature for the laser source. This permits increases and/or decreases in temperature to be made, however the temperature is this embodiment is less than or equal to about 1300 degrees C.

It is appreciated that either the laser or the workpiece or a combination thereof, can be translated to accomplish annealing of the workpiece. In this embodiment the laser is translated in a first approximately horizontal direction at approximately 150 millimeters per second, for example, thereby annealing a linear section of the workpiece. Once the entire linear section of the workpiece has been annealed in the x-direction at a given y-distance and the laser has moved off of the workpiece, the laser can be translated vertically in a second y-direction, for example at 504. The distance moved in the y-direction is such that the overlap between horizontal laser scans is with a predetermined value, for example, about 2-4 millimeters. This process is continued with the laser translated in the minus x-direction at 506 at approximately 150 millimeters per second across the entire wafer surface at a second y-distance. The entire process at 502, 504 and 506 is repeated at 508 as necessary so that the entire wafer surface is laser annealed, wherein the process ends.

Figure 6:
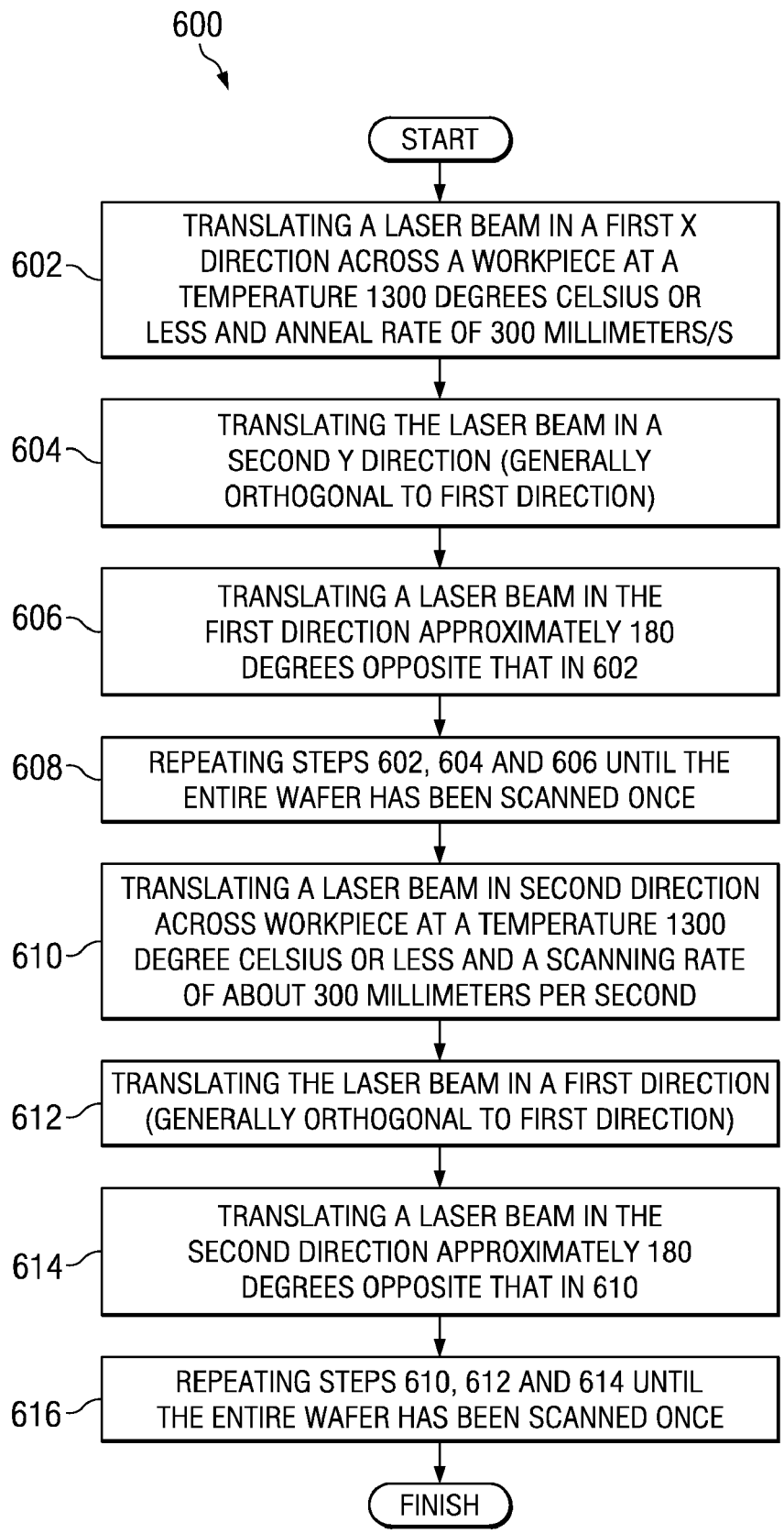
FIG. 6 is a block diagram illustrating yet another laser annealing process on the substrate in accordance with an exemplary aspect of the present invention.

FIG. 6 is a flow diagram illustrating a method 600 of operating a laser annealing method in accordance with an aspect of the present invention. The process 600 is very similar to the combined processes 200 and 300. The method 600 begins at block 602 wherein a laser is provided. The laser can be a pulsed CO2 laser or any other suitable laser that has enough power density to anneal the workpiece at the desired temperature. The laser has one or more tunable parameters that can be adjusted in order to modulate the laser annealing process. Some examples of parameters that modulate laser power include, for example, input power, laser beam size, temperature, dwell time, the temperature of the chuck where the workpiece sits on when laser annealing takes place. The laser generates a laser beam having a nominal temperature at block 602 of 1300 degrees Celsius and a nominal scanning rate 100 to 600 millimeters per second and in this embodiment of approximately 300 to 500 millimeters per second. Generally, the nominal or base temperature value is below a maximum producible temperature for the laser source. This permits increases and/or decreases in temperature to be made, however the temperature is this embodiment is less than or equal to about 1300 degrees C.

It is appreciated that either the laser or the workpiece or a combination thereof, can be translated to accomplish annealing of the workpiece. In this embodiment the laser is translated in a first approximately horizontal direction at 602, for example, thereby annealing a linear section of the workpiece. Once the entire linear section of the workpiece has been annealed in the x-direction at a given y-distance and the laser has moved off of the workpiece, the laser can be translated vertically in a second y-direction, for example at 604. The distance moved in the y-direction is such that the overlap between horizontal laser scans is within a predetermined value, for example, approximately about 2-4 millimeters. The process is continued at 606 with the laser translated in the minus x-direction across the entire wafer surface at a second y-distance. The temperature and the scanning rate is the same as that in the x-direction. The entire process at 602, 604 and 606 is repeated at 608 as necessary so that the entire wafer surface is laser annealed, wherein the process continues to 610.

Figure 2:
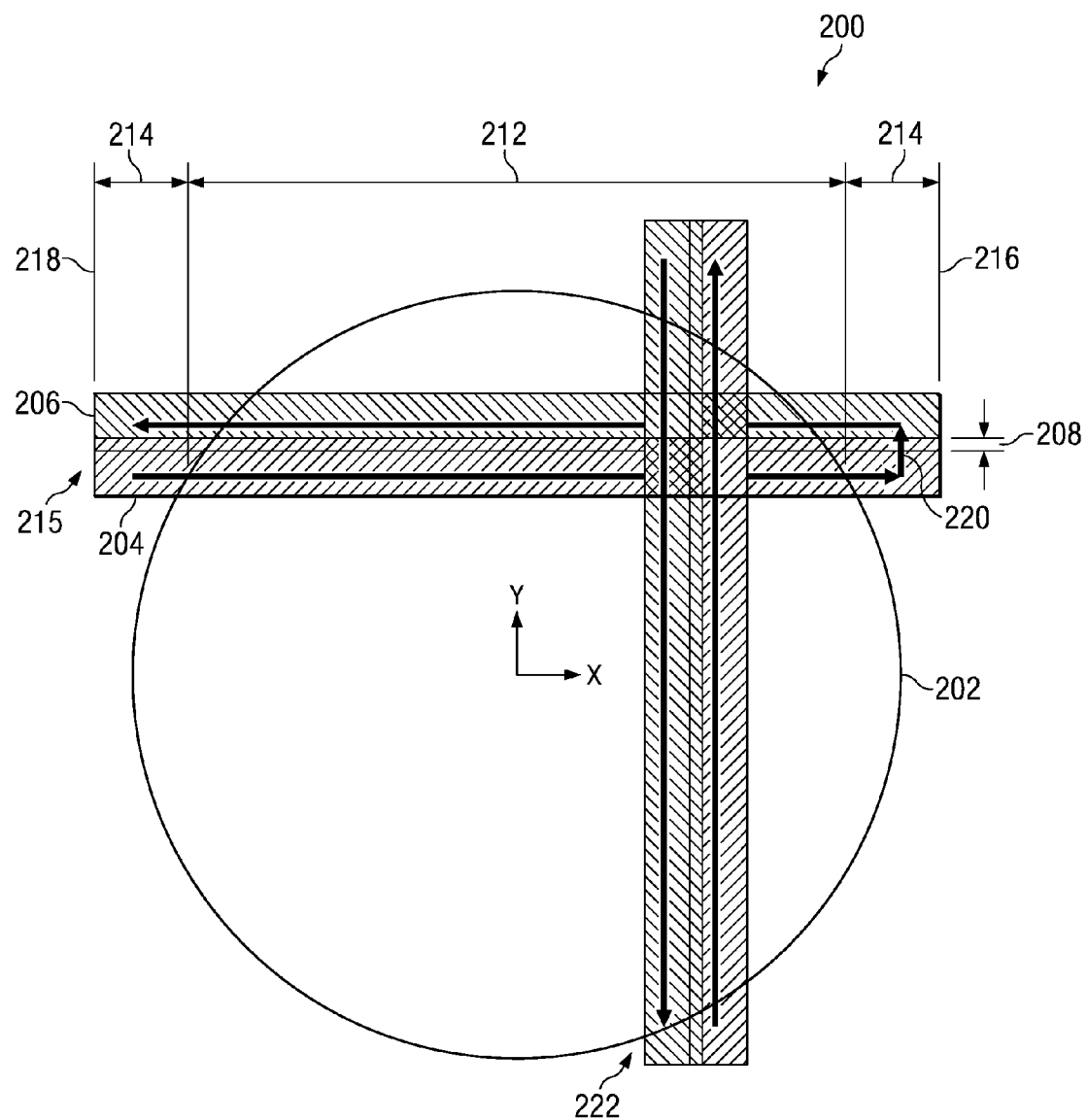
FIG. 2 is an exemplary laser beam projection in accordance with an aspect of the present invention.
Figure 3:
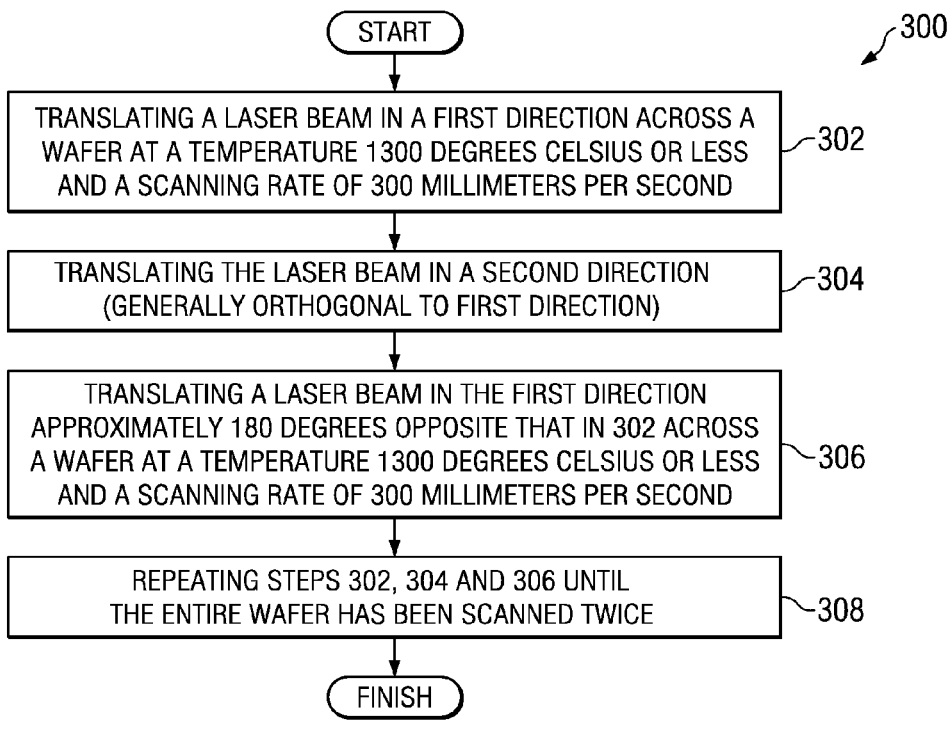
FIG. 3 is a simplified top view illustrating a laser scanning pattern on a workpiece according to yet another aspect of the present invention.

At 610 the laser anneal process 600 is then repeated, however the laser beam is scanned in a second direction scan pattern 222 (FIG. 2) that is perpendicular to the first scan pattern 215 (FIG. 2). At 610 the laser beam can be moved in a y-direction until the beam is off the wafer at it furthest vertical position, for example, a given x-distance and the laser has moved off of the workpiece, the laser can be translated horizontally in a second x-direction, for example at 612. The distance moved in the x-direction is such that the overlap between horizontal laser scans is within a predetermined value, for example, approximately about 2-4 millimeters. The process is continued at 614 with the laser translated in the minus y-direction across the entire wafer surface at a second x-distance. The temperature and the scanning rate is the same as that in the y-direction. The entire process at 610, 612 and 614 is repeated at 616 as necessary so that the entire wafer surface is laser annealed, wherein the process ends.

Figure 7:
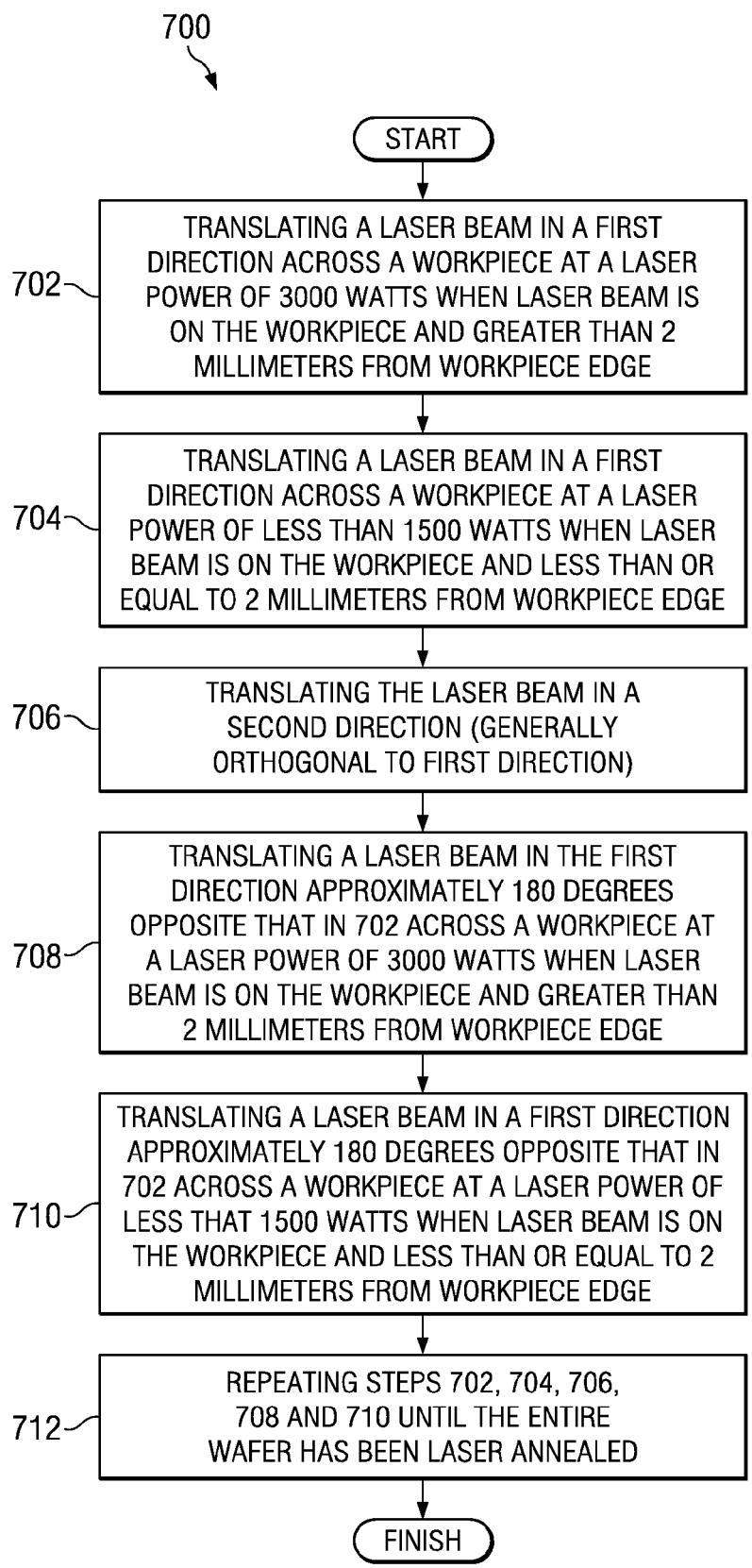
FIG. 7 is a block diagram illustrating a laser annealing process on the substrate in accordance with another exemplary aspect of the present invention.

FIG. 7 is a flow diagram illustrating a method 700 of operating a laser annealing method in accordance with an aspect of the present invention to reduce workpiece edge breakage. The process 700 is very similar to the process 400, wherein a laser power is reduced when the laser beam is on the workpiece and within a given distance from the workpiece edge. The method 700 begins at block 702 wherein a laser is provided, the laser can be a pulsed CO2 laser or any other suitable laser that has enough power density to anneal the workpiece at the desired temperature. The laser has one or more tunable parameters that can be adjusted in order to modulate the laser annealing process. Some examples of parameters that modulate laser power include, for example, input power, laser beam size, temperature, dwell time, the temperature of the chuck where the workpiece sits on when laser annealing takes place. The laser generates a laser beam having a nominal power at block 702 of about 3000 to 3500 Watts and a nominal scanning rate of 100 to 200 millimeters per second and in this embodiment of approximately 150 millimeters per second. Generally, the laser power remains at approximately about the 3000 Watt level when the laser is on the workpiece and at a distance of greater than 2 millimeters from the workpiece edge.

At 704 the laser beam is either on the workpiece or within 2 millimeters of the workpiece edge or off of the workpiece entirely. At 704 the laser power is reduced to 1500 Watts or less, for example. At 706 the laser beam is off of the workpiece at the furthest point in the x-direction for the given y-distance. The laser beam is translated in the y-direction, generally orthogonal to x-direction so that the overlap of the laser scans in the x-direction is within a desired range, for example 2-4 millimeters. At 708 the process is continued as in 704 except the laser beam is translated in a second minus x-direction, for example. Again the laser beam power is 3000 Watts when the laser beam is on the workpiece and greater than 2 millimeters from the workpiece edge. At 708 the laser beam is translated in the y-direction a predetermined distance so that the laser beam overlap is 2-4 millimeters, for example. At 710 the laser beam is within 2 millimeters of the workpiece edge or off of the workpiece entirely where the laser power can be reduced to 1500 Watts. At 712, for example, 702, 704, 706, 708, and 710 are repeated until the entire workpiece upper surface is laser annealed, wherein the process ends.

It is appreciated that either the laser or the workpiece or a combination thereof, can be translated to accomplish annealing of the workpiece. In this embodiment the laser is translated in a first approximately horizontal direction, for example, thereby annealing a linear section of the workpiece. Once the entire linear section of the workpiece has been annealed in the x-direction at a given y-distance and the laser has moved off of the workpiece, the laser can be translated vertically in a second y-direction, for example at 506. The distance moved in the y-direction is such that the overlap between horizontal laser scans is with a predetermined value, for example, about 2-4 millimeters. This process is continued with the laser translated in the minus x-direction at 506 across the entire wafer surface at a second y-distance. The temperature and the scanning rate is the same as that in the x-direction. The entire process at 502, 504 and 506 is repeated as necessary so that the entire wafer surface is laser annealed twice, wherein the process ends.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of manufacturing a semiconductor device, comprising:
   scanning a laser beam relative to a semiconductor workpiece along a first direction parallel to a first axis;
   moving the workpiece relative to the laser beam in a second direction parallel to a second axis that is transverse to the first axis;
   performing the laser anneal at a first laser power setting when the laser beam is on the workpiece and greater than 2 millimeters away from the workpiece edge; and
   performing the laser anneal at a second lower laser power setting when the laser beam is on the workpiece and about 2 millimeters or less from the workpiece edge.

2. The method of claim 1, wherein the first laser power setting is approximately about 3000 watts.

3. The method of claim 1, wherein the second lower laser power setting is approximately about 1500 watts.

4. The method of claim 1, wherein a laser anneal temperature is approximately about 1300 degrees Celsius or less.

5. The method of claim 1, wherein the second axis is orthogonal to the first axis.

6. The method of claim 1, wherein the laser beam has a beam width of approximately 0.15 millimeter and a beam length of approximately 7 millimeters.

7. The method of claim 1, wherein the second lower laser power setting is approximately one-half the power setting of the first laser power setting.

8. The method of claim 7, wherein the first laser power setting is about 3000 watts and the second lower laser power setting is approximately about 1500 watts.

9. A method of manufacturing a semiconductor device, the method comprising:
   performing a first laser annealing process at a temperature of about 1300° C. or less by scanning a surface of a semiconductor workpiece in a first scan pattern, moving a laser beam relative to the workpiece in successive overlapping scans of linear sections parallel to a first axis;

performing a second laser annealing process at a temperature of about 1300° C. or less by scanning the surface of the semiconductor workpiece in a second scan pattern, moving the laser beam relative to the workpiece in successive overlapping scans of linear sections parallel to a second axis transverse to the first axis.

10. The method of claim 9, wherein the laser beam moves relative to the workpiece at a laser anneal scanning rate of 150 millimeters per second with a laser annealing dwell time of about 1 millisecond for at least a major part at least one of the first laser annealing process and the second laser annealing process.

11. The method of claim 9, wherein the laser beam moves relative to the workpiece at a laser anneal scanning rate of 300 to 500 millimeters per second with a laser annealing dwell time of about 0.3 to 0.5 millisecond for at least a part of at least one of the first laser annealing process and the second laser annealing process.

12. The method of claim 9, wherein the laser beam has a beam width of approximately 0.15 millimeter and a beam length of approximately 7 millimeters.

13. The method of claim 9, wherein the first axis is an x-axis, and the second axis is a y-axis orthogonal to the x-axis.

14. The method of claim 13, wherein the scans of linear sections parallel to the first axis comprise:
(a) moving the workpiece relative to the laser beam in a first direction parallel to the x-axis for a first direction dimension of the workpiece plus a first scan pattern overshoot amount;
(b) moving the workpiece relative to the laser beam in a second direction parallel to the y-axis for a distance to define a first scan pattern overlap amount;
(c) moving the workpiece relative to the laser beam in a direction opposite the first direction for the first direction dimension of the workpiece plus the first scan pattern overshoot amount; and
(d) repeating (a)-(c) until the entire surface of the workpiece has been scanned.

15. The method of claim 14, wherein the scans of linear sections parallel to the second axis comprise:
(e) moving the workpiece relative to the laser beam in the second direction for a second direction dimension of the workpiece plus a second scan pattern overshoot amount;
(f) moving the workpiece relative to the laser beam in the first direction for a distance to define a second scan pattern overlap amount;
(g) moving the workpiece relative to the laser beam in a direction opposite the second direction for the second direction dimension of the workpiece plus the second scan pattern overshoot amount; and
(h) repeating (e)-(g) until the entire surface of the workpiece has been scanned.

16. The method of claim 15, wherein the first scan pattern and second scan pattern overlap amounts are approximately 2-4 millimeters.

17. The method of claim 15, wherein the laser beam scans the surface at a first power setting when the laser beam is on the workpiece and greater than a given distance from the workpiece edge; and the laser beam scans the surface at a second power setting lower than the first power setting when the laser beam is on the workpiece and less than the given distance from the workpiece edge.

18. The method of claim 9, wherein the laser beam scans the surface at a first power setting when the laser beam is on the workpiece and greater than a given distance from the workpiece edge; and the laser beam scans the surface at a second power setting lower than the first power setting when the laser beam is on the workpiece and less than the given distance from the workpiece edge.

19. The method of claim 18, wherein the given distance is 2 millimeters or less.

20. The method of claim 9, wherein the first laser annealing process and the second laser annealing process activate an implanted dopant species.

21. The method of claim 20, wherein the implanted dopant species is a dopant species implanted into at least one of a gate stack or source drain regions of a transistor.

22. The method of claim 9, wherein the first laser annealing process and the second laser anneal process are performed at a temperature of greater than 1200° C.

* * * * *